Figure 1:
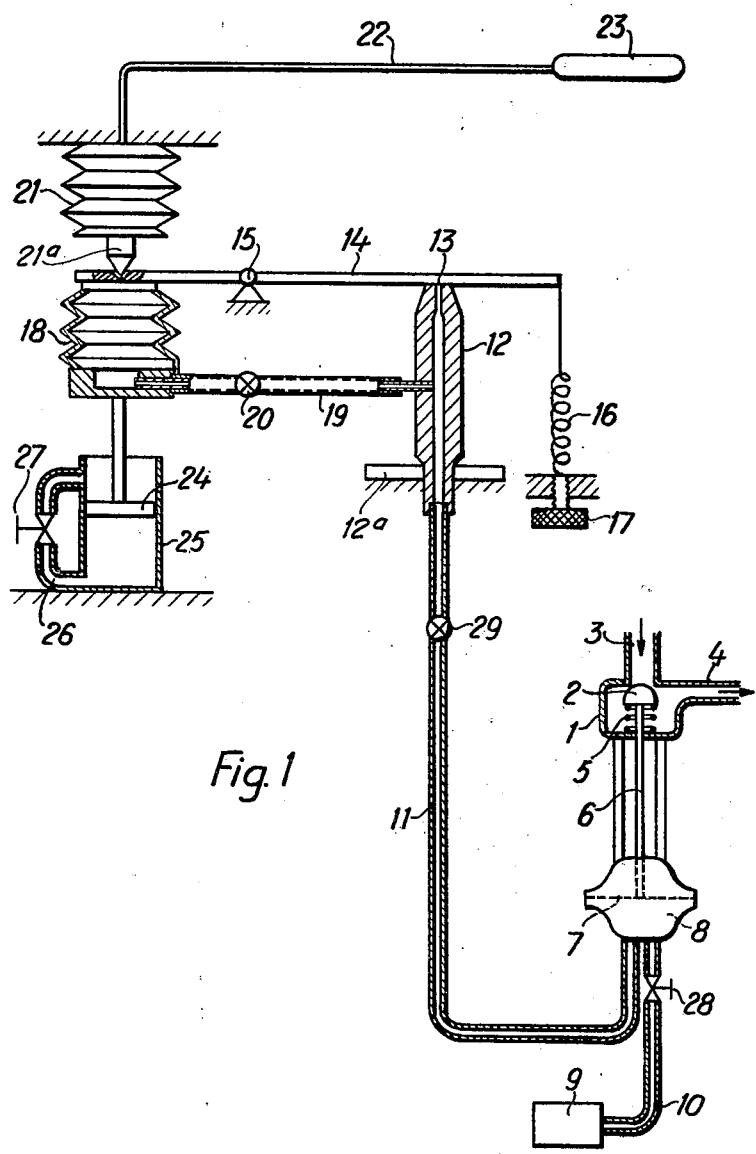

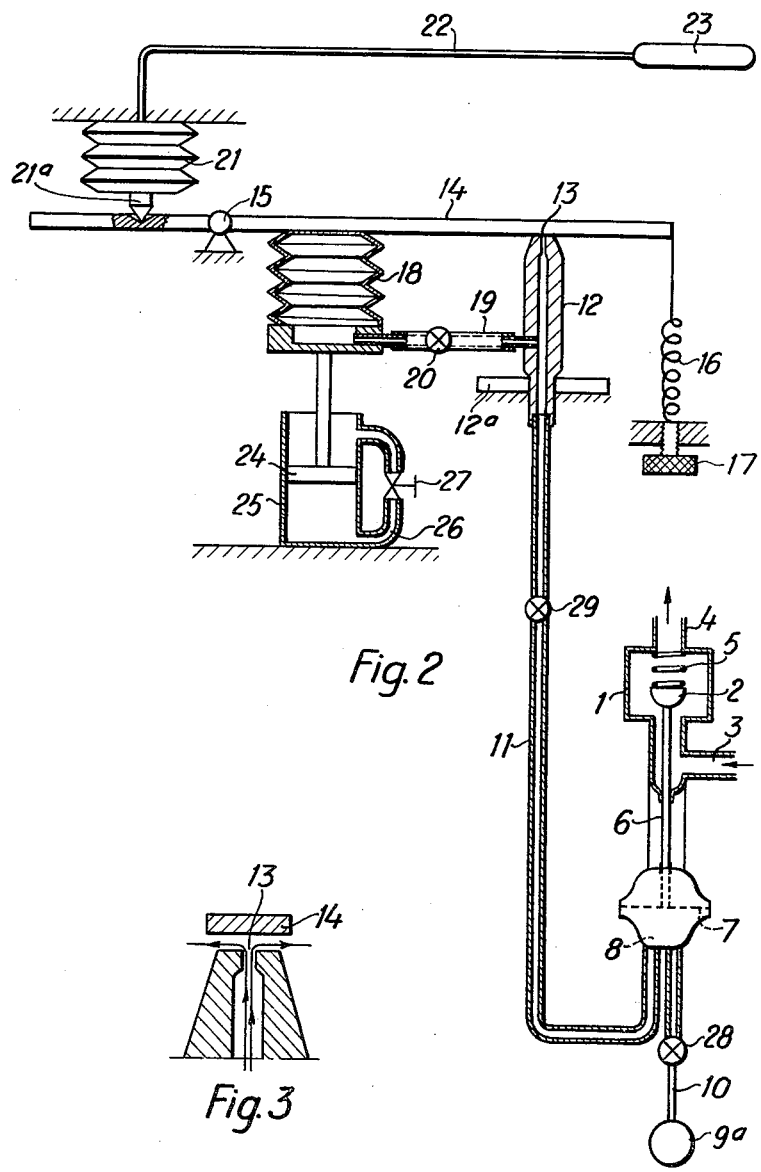

United States Patent Office 2,981,274
Patented Apr. 25, 1961

2,981,274

APPARATUS FOR CONTROLLING A VARIABLE QUANTITY SUCH AS TEMPERATURE OR PRESSURE

Fritz Johan Wennerberg, Lund, and Knut Bonde Hansen, Malmo, Sweden, assignors to Aktiebolaget Separator, Stockholm, Sweden, a corporation of Sweden Filed Nov. 20, 1957, Ser. No. 697,579

Claims priority, application Sweden Nov. 22, 1956

9 Claims. (Cl. 137—85)

The present invention relates to apparatus for controlling a variable quantity, such as temperature, pressure, etc. It has particular reference to such apparatus of the type comprising a control element, such as a valve, a pneumatic system for adjusting the control element to vary the quantity, an actuator responsive to variations in the quantity, and a device operated by the actuator for varying the pressure in the pneumatic system.

The accuracy with which this type of control apparatus functions depends largely on the extent to which it is possible to reduce the frictional forces affecting the movable parts. A characteristic of the apparatus of the present invention is that the moving parts are given an oscillating movement overlying the controlling movements proper, whereby the frictional forces existing in the apparatus do not affect or only slightly affect the accuracy of control.

An apparatus made according to the invention comprises a valve member oscillating in an unstable manner to vary the pressure in the pneumatic system. The oscillating means preferably include a nozzle communicating with the pneumatic system and operable to draw the valve member toward the nozzle by suction, thereby varying the pneumatic pressure in one direction, and a pneumatic actuator connected to the system and operable in response to this pressure variation to move the valve member away from the nozzle. The oscillating movements of the valve member are biased in one direction by the actuator responsive to variations in the quantity to be controlled, the biasing force increasing with a variation of the quantity in one direction.

For a better understanding of the invention, reference may be had to the attached drawings which diagrammatically illustrate two embodiments of the invention chosen by way of example. Figs. 1 and 2 illustrate schematically an apparatus in which the pneumatic system operates under vacuum and over-pressure, respectively. Fig. 3 is a sectional detail view of the nozzle and valve member in Fig. 2. For the sake of simplicity, the arrangements according to Figs. 1 and 2 may be assumed to constitute temperature controllers by means of which a constant temperature is maintained in a pasteurizer for heat treatment of milk.

In Fig. 1, a valve housing 1 is assumed to be inserted into the steam inlet of a pasteurizer (not shown) in such a way that the steam, on its way to the pasteurizer via the valve or control element 2, passes through the housing from its inlet 3 to its outlet 4. The valve 2 is actuated by a compression spring 5 which tends to move the valve towards its seat, thus shutting off the steam supply to the pasteurizer. The valve 2 is adjustable by means of servo-power in a pneumatic system, and for this purpose it is connected by a rod 6 to a membrane 7 defining a chamber 8 containing a servo-medium. Chamber 8 is kept under a suitable vacuum by means of a vacuum pump 9 which via a pipe line 10 communicates with the chamber 8. This chamber communicates through another pipe line 11 with a nozzle 12 fixed on a support 12a and whose orifice 13 opens into the ambient air. Opposite the nozzle orifice 13 is a lever 14 working as a valve member oscillating in an unstable manner. Lever 14 has a contact surface cooperating with the orifice and is adapted to oscillate on a pivot 15. The lever 14 is connected at its right-hand end to a spring 16 whose tension is adjustable by means of a screw 17 and which tends to bring the lever 14 in contact with the nozzle orifice 13. In this extreme position, the lever is influenced, through suction action, directly by the servo-medium. The lever 14 is connected at its left-hand end to a bellows 18 which is closed at its ends and, by means of a flexible hose 19, communicates with the channel of the nozzle 12. This communication is adjustable by means of a throttling member 20. The movable, free end of another bellows 21 has an operating connection 21a in contact with the upper side of the left-hand end of the lever 14, the other end of this bellows being fixed and its cavity communicating, by means of a pipe 22, with a sensitive body or bulb 23 intended to be located in the milk flow immediately after the heating section of the pasteurizer. The bellows 21, the pipe 22 and the sensitive body 23 form together an actuator containing a temperature-sensitive medium which is partly in a liquid state and partly in a gaseous state. The lower end of the bellows 18 is connected to a damping piston 24 which is movable in a cylinder 25 filled with a suitable liquid, e.g. oil, and the ends of which are interconnected by means of an overflow channel 26 in which there is an adjustable throttling member 27. The cylinder 25, in the same way as the nozzle 12 and the upper end of the bellows 21, has a fixed position. In the pipes 10 and 11, there are adjustable throttling members 28 and 29.

The operation of the control apparatus will be apparent from the following:

Assume that in the chamber 8 there is a vacuum of appropriate magnitude so that, owing to the suction action from the nozzle 13, the lever 14 assumes the lower extreme position in which it is brought into contact with the nozzle. Assume also that the spring 16 is then adjusted by means of the screw 17 so that the pressure from the bellows 21 is counterbalanced by the spring tension, and also that the throttling member 27 is substantially closed. The pressure is at first apt to be different in different parts of the apparatus due to the action of the throttling members 20 and 29. Gradually, the pressures are, however, equalized at different points in the apparatus. This means that the pressure in the bellows 18 gradually approaches that in the nozzle 12. The vacuum in the bellows 18 will finally be so great that its effect on the lever 14 overcomes the suction action on the lever from the orifice 13, whereby the lever is turned counter-clockwise about the pivot 15. The lever 14 is then instantly swung over to the upper extreme position in which the orifice 13 is uncovered. Atmospheric air then flows into the nozzle 12 causing the pressure there to rise. The pressure in the bellows 18 also rises, although more slowly due to the throttling in the throttling member 20. The lever 14 is thus swung downwards again toward the nozzle orifice 13 and, when approaching the nozzle, is subjected to its suction action, so that it is now brought rapidly to its first, lower, extreme position, that is, to bear against the nozzle. The pressure in the bellows 18 now drops, and this, too, takes place relatively slowly. The vacuum in the bellows 18 gradually becomes so great that the suction action from the nozzle 13 on the lever 14 is overcome and the lever is again swung to its upper extreme position. The lever 14 works, therefore, as a valve member oscillating in an unstable way by aid of the servo-medium and the pneumatic actuator constituted by the bellows 18, the hose 19 and the throttling member 20. The frequency and amplitude of the oscillations depend on the volume of the bellows 18 and the degree of throttling in the throttling member 20. It is evident that the chamber 8, the membrane 7 and the valve 2 are subjected to corresponding pressure variations and oscillations. For these parts, the amplitude and the frequency are regulated by means of the throttling member 29, an increased throttling here resulting in the valve amplitude being reduced whereas the frequency is increased correspondingly. On the other hand, an increased throttling by the valve 20 reduces the frequency and increases the amplitude.

The "ticking movements" described above take place quite independently of possible temperature variations. As the control element or valve 2 and the lever 14 are thus in uninterrupted motion, we avoid the static friction forces which otherwise would occur in connection with the controlling operation and which would give rise to a certain insensibility zone for the control apparatus. The time of oscillation of the lever 14 can, for example, be adjusted to be in the order of 0.2 to 1 sec. Each swing will then take a sufficiently long time for the ticking to propagate itself to the valve 2 and cause this to make a deflection of the magnitude of 0.5 to 3 mm. The time for each particular oscillation is, however, so short that there is not time for it to cause any change of temperature in the heat-treated liquid.

Assuming now that for some reason the liquid temperature rises, the gas pressure in the actuating member 21—23 rises too. This results in an increased, downwardly directed pressure on the left-hand end of the lever 14, the other end of the lever thus moving away from the nozzle orifice 13. This, in turn, causes the pressure in the nozzle 12 to rise to a higher value in order to make it possible to overcome the counterpressure from the bellows 21 and to return the lever to the nozzle orifice 13. In this way, an increased pressure is also obtained in the chamber 8, causing the valve 2 to throttle the supply of steam to the pasteurizer still more so that the temperature of the heated medium drops again.

It is apparent that a reduction of the temperature has an effect directly opposed to that caused by an increase in temperature, as described above, provided, of course, that the reduction in temperature is not so great that the contact between the operating connection 21a at the lower end of the bellows 21 and the lever 14 is broken.

If, on the other hand, the ticking movement is disregarded, it is evident that a temperature rise bringing about a lowering of the left-hand end of the lever 14, so that the nozzle orifice is uncovered, results in a pressure increase in the nozzle 12 and thus also (although with a certain retardation due to the influence of the throttling member 20) in the bellows 18, which thereby counteracts the movement transmitted to the lever by the bellows 21. The intensity of the impulse to the valve 2 which is ultimately caused by the temperature rise in the heat-treated liquid, is thus reduced.

As a general rule, self-induced oscillations in a control apparatus are apt to ensue more easily with a smaller ratio between the magnitude of a disturbance and the magnitude of the resulting change of the regulating medium. The tendency of self-oscillation is effectively counteracted by aid of the damping device. By means of the valve 27, it is easy to adjust the damping to the desired value in each particular case. If the valve 27 is opened to a suitable extent, this means that upon a temperature rise the piston 24 is moved downwards until a new state of equilibrium is attained where it no longer takes any power and where the position of the lever 14 and, consequently, the degree of opening of the valve member formed by the lever is determined exclusively by the forces in the bellows 21 and the spring 16.

In the state of equilibrium, the spring 16 balances the bellows 21, whose driving force is determined by the temperature of the bulb 23 and, consequently, by the temperature of the heat-treated medium. Operation of the screw 17 changes the tension of the spring 16 and thereby adjusts the temperature of the heat-treated medium to the desired value.

The control apparatus of Fig. 2 operates with compressed air as the servo-medium and therefore employs a compressor 9a in place of vacuum pump 9. The mode of operation here does not differ in principle from that of the arrangement shown in Fig. 1. The bellows 21 in this case, however, must be placed at the side of the pivot 15 opposite to that where the bellows 18 is located. In this case, too, the nozzle 12 exercises a suction action on the lever if this is sufficiently near to the nozzle orifice, and the suction action increases within a certain zone when the lever approaches the nozzle. To explain the generation of this suction action, reference is made to Fig. 3 showing an axial section of the upper part of the nozzle at right angles to the longitudinal direction of the lever 14. Around its orifice 13, the nozzle has a plane surface which is at least approximately parallel to the surface of the lever facing the orifice. Air which is forced out through the nozzle orifice must, consequently, pass through the slot formed by these two surfaces. In this slot, a fall of pressure results, corresponding to the velocity head of the air $$\gamma \frac{v^2}{2g}$$

and the suction action on the lever is equal to this velocity head multiplied by the size of the plane surface surrounding the nozzle orifice, thus being equal to a $$\gamma \frac{v^2}{2g}$$

where $a$ denotes the size of the surface in question, $\gamma$ the specific gravity of the air, $v$ its velocity, and $g$ the acceleration of the force of gravity. When the lever approaches the nozzle, the velocity $v$ is increased in the beginning, and, consequently, the suction action. As a result, an instability is obtained of the same kind as in the vacuum-driven apparatus, so that the ticking movement is also maintained in this case. If the lever 14 comes sufficiently close to the nozzle, the velocity of the air in the slot is again reduced, and the lever is instead subjected to a repulsive action from the air in the nozzle orifice. This range of operation, is, however, of no immediate interest as regards the normal functioning of the control apparatus.

The apparatus as illustrated may be modified in one or more respects without departing from the invention. Thus, any other medium than steam can be used as a heating medium, for example, hot water, hot air, etc. The medium may also be used to carry away heat and may thus consist of cooling water or the like. The control apparatus may also be used for other purposes than that described above, e.g., for maintaining constant the gas pressure in a room, the level in a receptacle, the speed of revolution of a machine, etc. The adjustment of the desired temperature may be effected in other ways than by changing the tension of the spring 16, for instance, by changing the position of the turning point 15 laterally or vertically. A spring could also be used which is fastened between the piston 24 and the bottom of the cylinder 25, and whose tension is adjustable, e.g. by means of an adjusting screw inserted through the bottom or by lengthening or shortening the piston rod connecting the piston 24 with the lower end of the bellows 18.

The communication between the nozzle 12 and the bellows 18 can be attained otherwise than by the flexible hose 19, e.g. by means of a rigid pipe being turnably or movably arranged in a stuffing box or the like. Such communication should hinder the movements of the bellows 18 to the least possible extent.

It will be apparent that the lever 14 constitutes an oscillatory valve member operatively connected to the pneumatic system 7—10 through the parts 11—13 and adapted to vary the system pressure, such variations acting to move the control element 2 connected to the system through rod 6, thereby increasing or decreasing the quantity to be controlled. The pneumatic actuator 18 and the nozzle 12, both connected to the pneumatic system through pipe 11 and adjustable throttling member 29, constitute a means for oscillating the valve member 14 periodically. Through the operating connection 21a between the oscillating means and the actuator 21—23, the latter urges the valve member 14 in the direction to decrease the quantity (through closing movement of control element 2) in response to an increase in the quantity as sensed by the actuator 21—23. The bellows 21 constitutes a member biasing the oscillating movements of valve member 14 in one direction (counter-clockwise as shown) with a yielding force and operable to increase this force in response to a variation of the quantity in one direction (upward as shown).

We claim:

1. In apparatus for controlling a variable quantity and having a control element movable to vary said quantity, a pneumatic system connected to said element for moving the same to vary said quantity with variations of the pressure in said system, and a first actuator responsive to variations in said quantity, the combination of an oscillatory valve member operatively connected to the pneumatic system for varying the pressure therein, the valve member being movable in one direction to increase said quantity through movement of the control element by variation of said pressure and being movable in the opposite direction to decrease said quantity, means connected to the pneumatic system and operable by said pressure to oscillate the valve member periodically, the oscillating means including a nozzle connected to the pneumatic system and positioned to exert on the oscillatory valve member a sucking action which increases as the distance between said member and the nozzle orifice decreases, said means also including a pneumatic actuator connected to said system and operable in response to variation of said pressure in one direction to move the valve member to vary said pressure in the opposite direction, said valve member, nozzle and pneumatic actuator forming a self-oscillating means, and an operating connection between said oscillating means and the first actuator and through which the first actuator urges the valve member in the direction to decrease said quantity in response to an increase in said quantity.

2. The combination according to claim 1, in which said nozzle is operable, when drawing the valve member toward the nozzle by suction, to vary said pressure in one direction, said pneumatic actuator being operable in response to said pressure variation in said one direction to move the valve member away from the nozzle.

3. The combination according to claim 1, comprising also an adjustable throttling member through which the pneumatic actuator is connected to said system.

4. The combination according to claim 1, comprising also a movable support for the pneumatic actuator, said support being movable in the direction of movement of the pneumatic actuator, and a damping device operatively connected to the support for damping the movements thereof.

5. The combination according to claim 1, comprising also a piston supporting the pneumatic actuator, a cylinder in which the piston is movable in the direction of movement of the pneumatic actuator, a duct interconnecting the ends of the cylinder, and an adjustable valve in the duct.

6. The combination according to claim 1, comprising also a spring connected to the valve member and urging the same in the direction opposite to the direction in which the valve member is urged by said pneumatic actuator in response to an increase in said quantity.

7. The combination according to claim 1, in which the nozzle has an orifice adapted to be opened and closed by the valve member, said valve member being a lever pivoted for oscillation.

8. The combination according to claim 1, in which the nozzle has an orifice adapted to be opened and closed by the valve member, said valve member being a lever pivoted for oscillation, said pneumatic actuator including a bellows fixed at one end and connected at the other end to said operating connection, said last connection engaging the lever and being operable by the bellows to withdraw the lever from the nozzle orifice.

9. In apparatus for controlling a variable quantity and having a control element movable to vary said quantity, and a pneumatic system connected to said element for moving the same to vary said quantity with variations of the pressure in said system, the combination of an oscillatory valve member operatively connected to the pneumatic system for varying the pressure therein, means for oscillating the valve member periodically including a nozzle connected to the pneumatic system and positioned to exert on the oscillatory valve member a sucking action which increases as the distance between said member and the nozzle orifice decreases, said oscillating means also including a pneumatic actuator connected to the system and operable by variation of said pressure in one direction to move the valve member to vary said pressure in the opposite direction, said valve member, nozzle and pneumatic actuator forming a self-oscillating means, and a member biasing the oscillating movements of the valve member in one direction with a yielding force and operable to increase said force in response to a variation of said quantity in one direction.

References Cited in the file of this patent

UNITED STATES PATENTS

| | | |
|---|---|---|
| 859,629 | Symons | July 9, 1907 |
| 897,676 | Thompson | Sept. 1, 1908 |
| 2,223,712 | Ziebolz | Dec. 3, 1940 |
| 2,536,198 | Matiner | Feb. 2, 1951 |
| 2,743,710 | Shannon | May 1, 1956 |
| 2,762,385 | Smerke | Sep. 11, 1956 |
| 2,769,453 | DuBois | Nov. 6, 1956 |
| 2,776,670 | Hunt | Jan. 8, 1957 |
| 2,790,427 | Carson | Apr. 30, 1957 |
| 2,808,725 | Booth | Oct. 8, 1957 |

FOREIGN PATENTS

| | | |
|---|---|---|
| 900,424 | France | Oct. 2, 1944 |